United States Patent
Soman et al.

(10) Patent No.: US 11,595,426 B2
(45) Date of Patent: Feb. 28, 2023

(54) RISK BASED VIRTUAL WORKSPACE DELIVERY

(71) Applicant: VMware, Inc., Palo Alto, CA (US)

(72) Inventors: Sisimon Soman, Sunnyvale, CA (US); Padoor Chandramohan Arun, Singapore (SG)

(73) Assignee: VMware, Inc., Palo Alto, CA (US)

( * ) Notice: Subject to any disclaimer, the term of this patent is extended or adjusted under 35 U.S.C. 154(b) by 425 days.

(21) Appl. No.: 16/937,992

(22) Filed: Jul. 24, 2020

(65) Prior Publication Data

US 2022/0030023 A1  Jan. 27, 2022

(51) Int. Cl.
*H04L 9/40* (2022.01)
*G06F 9/455* (2018.01)

(52) U.S. Cl.
CPC ...... *H04L 63/1433* (2013.01); *G06F 9/45558* (2013.01); *H04L 63/20* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,584,508 | B1* | 9/2009 | Kashchenko | G06F 21/577 726/25 |
| 10,182,078 | B2* | 1/2019 | Zhang | H04W 12/06 |
| 10,511,607 | B2* | 12/2019 | Bansal | H04L 63/0272 |
| 2007/0180450 | A1* | 8/2007 | Croft | H04L 67/568 718/1 |
| 2007/0192329 | A1* | 8/2007 | Croft | G06F 3/1415 |
| 2014/0007048 | A1* | 1/2014 | Qureshi | H04L 9/0891 717/110 |
| 2014/0007193 | A1* | 1/2014 | Qureshi | H04W 12/30 726/3 |
| 2019/0004845 | A1 | 1/2019 | Ganesan | |
| 2019/0188392 | A1 | 6/2019 | El-Moussa | |
| 2020/0004936 | A1* | 1/2020 | Avital | G06F 21/31 |
| 2021/0334091 | A1* | 10/2021 | Gujarathi | G06F 9/4843 |

* cited by examiner

*Primary Examiner* — Joseph P Hirl
*Assistant Examiner* — Hassan Saadoun
(74) *Attorney, Agent, or Firm* — Clayton, McKay & Bailey, PC (57) ABSTRACT

Systems and methods can enable select virtual session capabilities on a user device configured to access a virtual session, which is an instance of a virtual machine. The user device can receive and forward to a gateway sever, a request to launch a virtual session. Based on the virtual session launch request, the gateway server can obtain a compliance profile determined from operational data. The gateway can permit user device access a virtual session hosted on a virtual machine ("VM") server. The VM server can use the compliance profile and security data from the user device to determine a risk profile of the user device. The virtual session can be configured at the VM server based on the risk profile so as to allow access to a subset of available applications and functions within the applications for the virtual session.

20 Claims, 4 Drawing Sheets

RISK BASED VIRTUAL WORKSPACE DELIVERY

BACKGROUND

Enterprises are increasingly utilizing computing infrastructures that implement virtual environments to provide flexible computing solutions that increase work force productivity. With a virtual environment, an employee can use a computing device that may be their own, issued by an enterprise, or publicly available, to access virtual sessions hosted by a server for the enterprise. A virtual session can be an instance of a virtual machine ("VM") that is instantiated by a server. The virtual session can constitute a virtualized computing environment that is accessed over a period of time that can be monitored, managed, or limited for security and other purposes. The virtual session can allow workers to effectively access a desktop and enterprise applications that run in the respective virtual machine. More succinctly, a virtual session can simulate an operating system that supports multiple applications and provides an enterprise managed computing environment that can be utilized by an employee on different devices and from multiple locations.

A foundational purpose for enterprises to utilize virtual environments is to provide increased opportunities for employees to be productive. Such environments allow an enterprise and its employees to utilize productivity tools and produce work products at any time, and at locations or facilities where the enterprise, aside from the employee, has no presence. Ideally, an employee can remotely work within a computing infrastructure of an enterprise, using the same or substantially the same applications as when they are "at work."

However, the flexibility and increased productivity mentioned above must be balanced with security measures. Virtual environments must prevent sensitive or propriety information from being made available or stolen. As a result, computing devices used by employees, such as tablets, laptops, mobile phones, and other mobile devices, are managed, updated, or otherwise maintained by enterprises to keep data access secure. This can include enforcing encryption, updating security patches and enterprise-specific anti-virus programs, enforcing setting and firewall configurations, approving versions of operating systems, jailbreak detection protocols, and requiring certain authentication methods.

Zero-trust architectures follow a security concept centered on not automatically trusting anything inside or outside of an architecture's perimeters, and verifying anything and everything trying to connect to systems supported by the architecture before granting access. Applying the zero-trust security concept to virtual environments leads to denying access to a virtual session for a device that is not in compliance with an enterprise-specified state for any of a number of components, programs, or network connections. For example, because a mobile device is not compliant with 1 out of a 100 compliance rules, access to a virtual session is denied in total under a conventional implementation of a zero-trust security policy. Although security may be preserved, there is a cost in productivity due to employee downtime—even where no aspect of the non-compliance impacts a productivity-related activity for which the virtual session is being accessed.

As a result, a need exists for a system and method for enabling secure access to virtual sessions and selectively enabling virtual session applications based on a risk profile that would be unsatisfactory for granting access to a virtual session configured to implement a full capability scheme, particularly when a zero-trust protocol is being concurrently implemented.

SUMMARY

Examples described herein include systems and methods for enabling select virtual session applications on a user device that is configured to access virtual sessions from a VM server. A system can include the user device, or at least one or more managed agents on the user device, a gateway server, and the VM server, that can communicate with one another. In one example, a user can launch a virtual session on the user device by remotely accessing the VM server, which can run a virtual desktop on a VM. In one example, a VM client on the user device can send a virtual session launch request to the gateway server. The gateway server can obtain a compliance profile for the user device based on receiving the virtual session launch request. The compliance profile can be based on operational data for the user device. As a result, by processing the compliance profile, the gateway server becomes informed of the state of certain components, settings, applications, connections, peripheral device connections, and various operations (together referred to as "operational aspects") for the user device. Thus, the compliance profile includes state information for a group of operational aspects that can be monitored on a user device. An enterprise can monitor the device through the compliance profile to keep the device up to date and minimize system security threats and vulnerabilities. Based on the compliance profile, the gateway server can permit the user device to access a virtual session hosted on the VM server.

In one example, the VM server can retrieve network security information from the user device that relates to the user device's active network connection. The VM server can analyze the network security information and the compliance profile to determine a risk profile of the user device. Based on the risk profile the VM server can configure the virtual session. In one example, configuring the virtual session includes establishing a specified group of virtual session capabilities and applications that will be able to be accessed or implemented while the user device accesses the virtual session.

The available applications can differ based on the user's risk profile. The applications can have different risk score thresholds that allow the VM server to determine which applications and application features to allow. In one example, the VM server can load applications that fit the risk profile into the virtual session. In another example, the applications can be preloaded in the operating system of the virtual session, and the VM server can disable applications that don not fit the risk profile. The VM server can also enable and disable certain features of an application based on the risk profile.

The user device can access the virtual session through a virtual channel between the user device and the VM server. In one example, a VM client on the user device can communicate with a VM agent that executes at the VM server. After access is permitted and the virtual channel is established, the VM client can receive graphics from the VM server and send input data to the VM server for implementation at the remote desktop. The VM server can continuously receive network security information and modify the available applications and application features based on the updated risk profile.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods can enable select virtual session capabilities on a user device based on a risk profile for the user device. To access a virtual session, the user device can send a request to a gateway sever. Based on the virtual session launch request, the gateway server can obtain a compliance profile determined from operational data. The compliance profile can describe whether the user device complies with policies set forth by a management server that is part of a unified endpoint management ("UEM") system, in an example. The gateway can permit user device access a virtual session hosted on a VM server. The VM server can use the compliance profile and security data from the user device to determine a risk profile of the user device. The virtual session can be configured at the VM server based on the risk profile so as to allow access to a portion of available applications for the virtual session. The VM server can determine available applications and allowed functionality within them by comparing the risk profile to different risk thresholds for the different applications. This can allow the user to still access certain applications even when their compliance or device security is not optimum, allowing for increased productivity while still safeguarding the enterprise.

Figure 1:
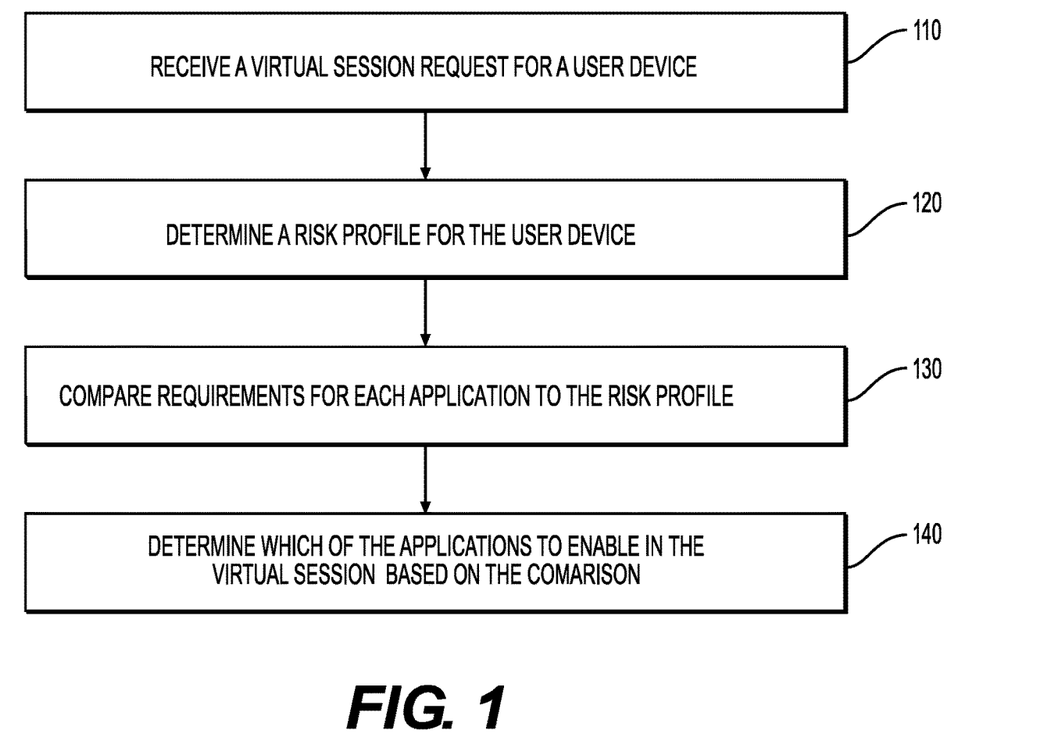
FIG. 1 is a flowchart of an example method for configuring access to applications in a virtual session on a user device.
Figure 2:
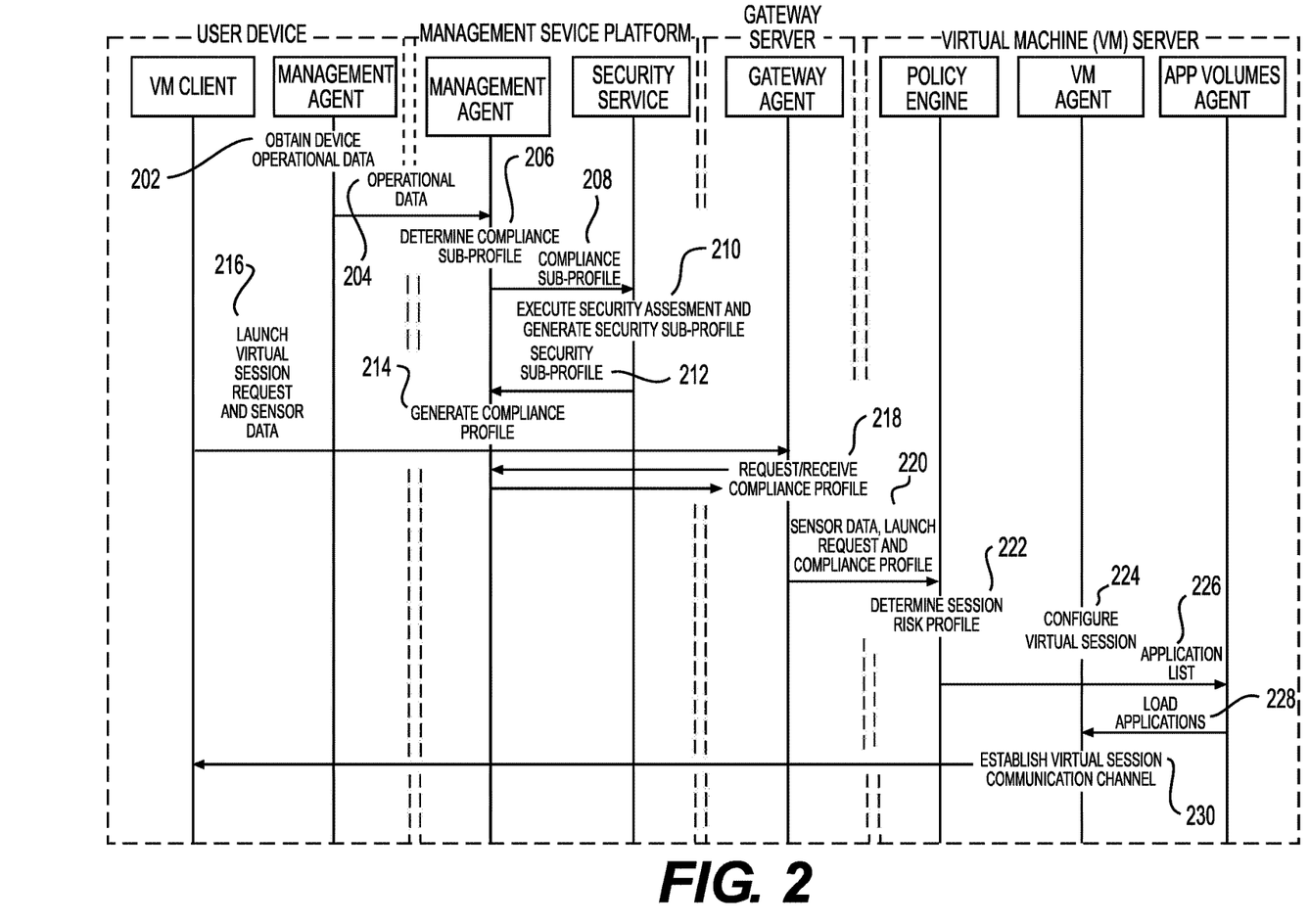
FIG. 2 is a sequence diagram of an example method for configuring access to applications in a virtual session on a user device.
Figure 3:
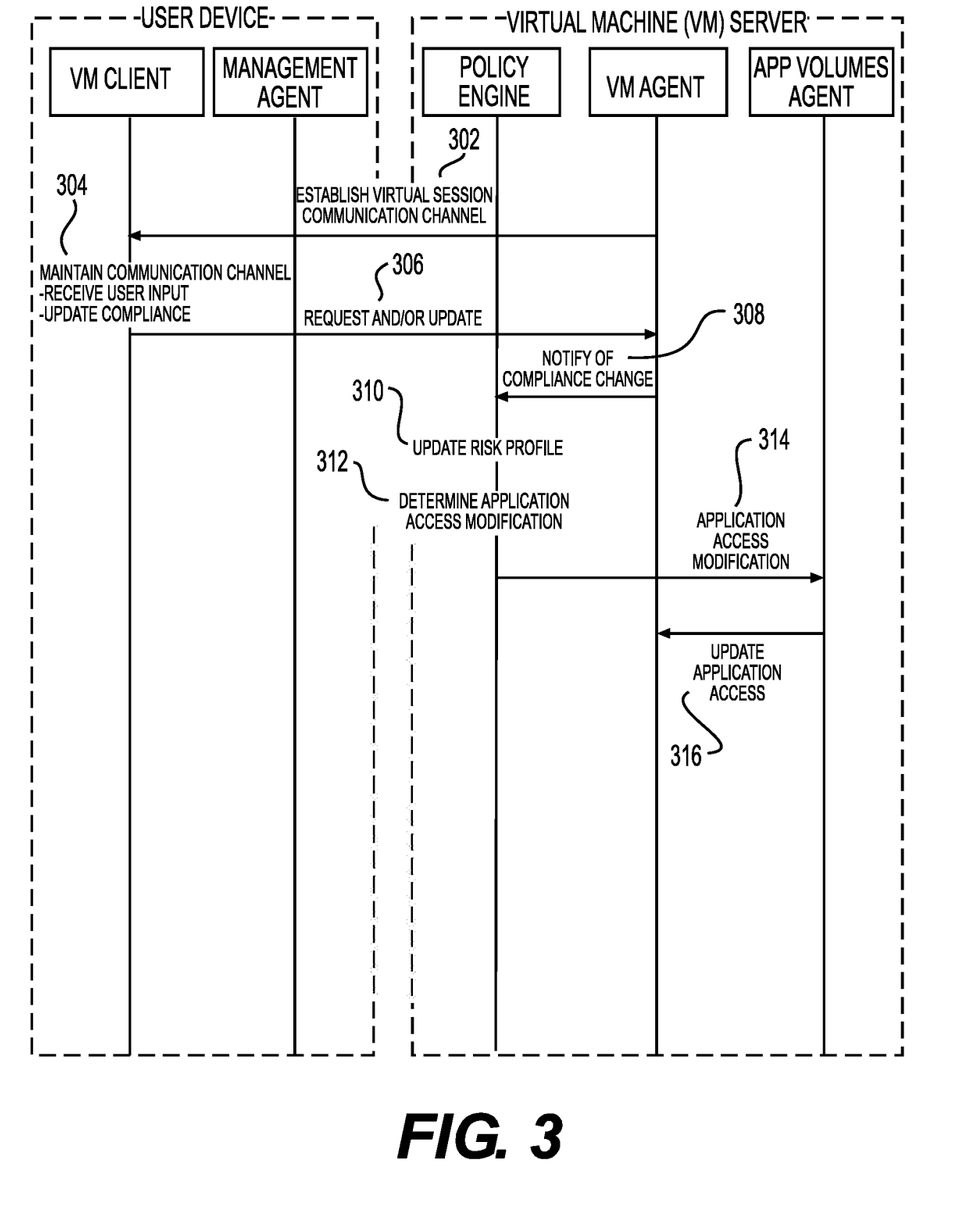
FIG. 3 is a sequence diagram of an example method for updating application access during a virtual session.

FIG. 1 is a flowchart of an example method for configuring access to applications in a virtual session on a user device. FIG. 2 provides a detailed sequence diagram for an aspect of the method of FIG. 1 directed toward configuring access to applications in a virtual session based on a risk profile for a user device. FIG. 3 provides a detailed sequence diagram for an aspect of the method of FIG. 1 directed toward configuring virtual session applications and updating application availability based on changes to a risk profile for a user device. Changes to the virtual session applications can be enforced by one or more agents being implemented on a VM server which hosts the virtual session being accessed by the user device.

Figure 4:
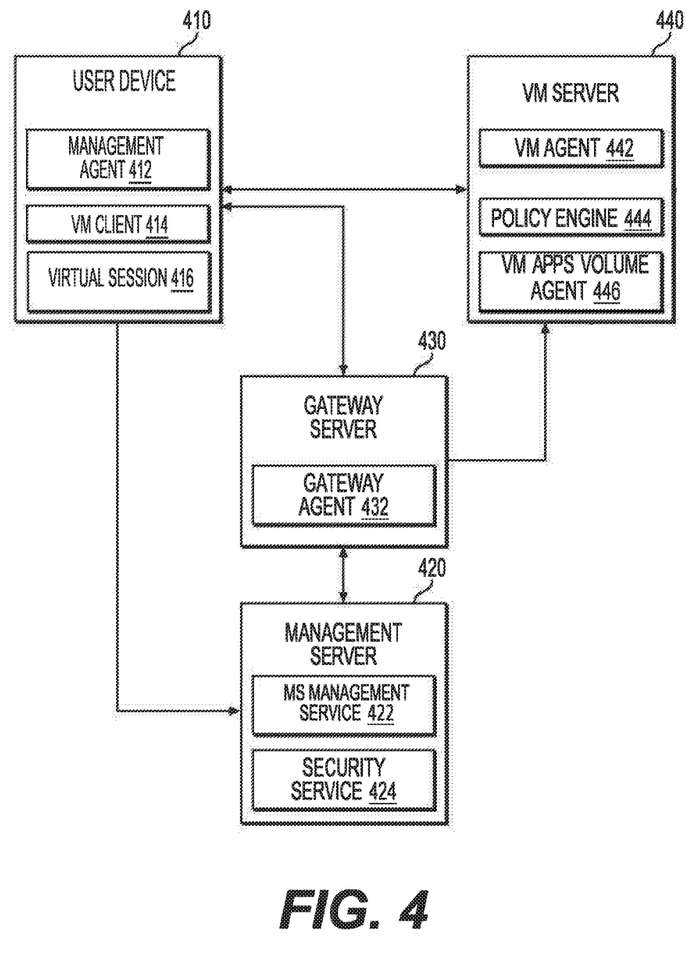
FIG. 4 illustrates a schematic representing exemplary system components for configuring access to applications in a virtual session on a user device.

FIG. 4 illustrates a schematic representing exemplary system components and communications between system components for implementing the methods described herein. FIG. 4 can represent system components of an enterprise computing infrastructure that generates and continuously monitors implementations of virtual session application schemes on user devices. The user devices can be enterprise-owned, enrolled with a UEM system, or constitute bring your own device ("BYOD") to work devices.

FIG. 1 is an example method with stages performed by a computing system architecture that may include one or more servers that may be connected through a network and implement or maintain: a backend; one or more user interfaces; one or more databases; and a plurality of computing services.

At stage 110, a VM server can receive a virtual session launch request from a VM client operating on a user device. The request can be generated based on a user input to an interface for the user device, or a specific interface for the VM client provided on the user device. In another example, the input causing the request can be generated by an operating system ("OS") on the user device or the VM client itself performing a programmed routine that requires access to a virtual session.

In one example, the VM client can be a managed application that is installed on the user device as part of enrolment in a UEM system. The VM client can provide access to VMs managed by the enterprise on a VM server. In one example, a management interface for a VM server can open a socket for sending graphics information from a virtual session to the VM client. The socket can be used for sending user interface events from the user device to a virtual session. In one example, the VM client can send the virtual session launch request to a gateway server. The gateway server can include one or more servers, and can be a reverse proxy server. As such, the gateway server can be maintained behind a firewall in a private network and can direct requests from clients to an appropriate backend server, such as the VM server.

At stage 120, the VM server can determine a risk profile for the user device. The risk profile can be determined from operational data acquired from a plurality of sensors monitoring various aspects of the operations of the user device. In one example, the sensors can monitor and obtain current values for one parameter or a group of operational aspects that respectively define operational states of different components, services, and agents for the user device. As some examples, the operational data can include things like whether the operating system (OS) autoupdate service is enabled, whether security patches are up to date, whether drive encryption is enabled, virtual private network (VPN) status if installed, internet protocol security (IPSec) status, whether screen lock is enabled, whether the device firewall is configured appropriately, rooting and jailbreak detection enabled and running, whether the device is enrolled with the UEM, anti-virus installation (installed and active or expired), anti-virus signature age (virus samples recently updated), device authentication method for the device, smartcard or biometrics settings, whether multifactor authentication is enabled, specific services running like User Account Control (UAC), whether Encrypting File System (EFS) is enabled and running, whether DLP (Data Loss Prevention) is enabled and running, known vulnerabilities from installed apps and platform libraries, and any missing critical application security patches.

In an example, the VM agent can be configured to collect operational data that can be monitored on the user device. The VM agent can periodically upload this data, or updates to the device's security state, to a centralized storage device, such as a database server. When a user initiates a virtual desktop session, the launch request can be received by a gateway server. The gateway server can retrieve the operational data for the user from the centralized storage device using a device identifier, such as a media access control (MAC) address or International Mobile Equipment Identity (IMEI) number. The gateway server can forward the launch request and operational data to the VM agent. In one example, the user device can send network security information with the launch request. The network security information can include information related to the user device's active network connection. As some examples, the network security information can include whether the device is connected to an open or password secured network, the wireless encryption mode for the network (WEP; WPA; WPA2), and the Geo/IP location of the device and the device location.

In an example, the VM agent can determine a risk profile for the user device based on all or some of the operational data. In one example, the VM agent can be configured to make certain assumptions for unavailable data. For example, if the VM agent cannot determine whether the user device is connected to an open or secured network, the VM agent can be configured to assume the network is open when creating the risk profile. The risk profile can help determine how vulnerable the user device is and which features of a virtual workspace session are potentially exploitable by an attacker to infiltrate into a corporate network or exfiltrate corporate data from the session.

At stage 130, the VM server can compare the risk profile to requirements for applications available to be enabled in the virtual session. The comparison can determine which applications can be enabled in the virtual session. In one example, the set of applications available to a user can depend on the user's profile, such as the user's position in a company. In an example, the VM server can determine which applications a user can access using a user identifier (ID) or group IDs. Also, each application can be an individual container and tagged with various attributes, such as business functions and financial data. As an example, a user in a finance department of an enterprise can have access to attached with applications tagged as "Finance," and human resource (HR) users with applications tagged as HR. Some applications can be available to multiple groups, such as an email application, and other applications can be group specific. For example, some financial applications may not be available to HR users.

In one example, a compliance score from the management server of a UEM system can be used in determining the risk score for the user device. For example, if the user device is compliant, then the risk score can be lowered. If the user device is non-compliant, this may just scale the risk score towards higher risk without necessarily forbidding access to the applications associated with the user.

At stage 140, the VM server can load applications into the virtual session that fit the user's risk profile. Alternatively, the VM server can disable applications that do not fit the risk profile. In an example, this can be done according to the comparison at stage 130. The VM server can be configured to load only the applications that match the risk level of the user device's risk profile or allow a lower risk level. For example, applications in the high level can be loaded regardless of the user device risk level. Applications in the medium level can be loaded if the user device fits into the medium or low levels, but not high. Finally, low level applications can be loaded only if the user device is also on the low level. In an example, application configuration settings regarding virtual session access can be set by an administrator of a UEM system.

In one example, an administrator can categorize applications differently across risk categories, creating varied levels of access. A console with a graphical user interface ("GUI") can allow the administrator to select specific applications and assign risk categories. In another example, the console can allow the administrator to specify different restrictions for a single application according to the different risk categories. For example, the application can be fully accessed when the risk score is low, certain features can be disabled when the risk score is medium, and the application can be completely excluded from access when the risk score is high. In this way, the administrator can adjust a gradient of different access levels for an application depending on the risk score. Risk profiles for the applications can be stored at the management server of the UEM and retrieved for purposes of comparison at stage 130. For example, to access a first application with a low risk categorization, the user's risk score must also be low enough to qualify as low risk, in an example. A second application may only require a medium risk score for access, allowing the user to access the second application even when their risk score is too high for the first application to be made available. More than three different risk categories are also available in some examples.

In one example, the VM server can load an application into the virtual session but disable certain features or services of the application. For example, an application may have a broad range of functions and features, and some may be sensitive while others are not. When a virtual session poses a potential security risk, the VM server can be configured to disable sensitive aspects of the application while enabling non-sensitive aspects.

In an example, the VM server can disable features of a virtual session when the user device poses a security risk. For example, the VM server can include a filesystem filter driver that merges files and directories from an application with the base operating system of the user device. In one example, the VM server can disable this feature on the user device end so that files from the user device cannot be transferred into the virtual workspace. In another example, the VM server can disable this feature on the server end so that the user device cannot access system files outside the virtual workspace. In still another example, the VM server can disable this feature for only applications in the virtual session that contain sensitive data.

In an example of the previously described method, the virtual session can be configured with a sensitive financial application, such as an accounting application, and a productivity application, like ADOBE ACROBAT READER. When the user launches a virtual workspace session or reconnects to an existing session using open Wi-Fi from a café, the VM server can disable the accounting application while allowing the user to launch and use ACROBAT READER while inside the virtual workspace. This can mitigate the risk of the user exposing sensitive financial data at an untrusted location.

Some enterprise systems assign applications to users or groups. When a user initiates a virtual session, the VM server loads applications assigned to that user as a bundle. In one example of such a system, the VM server can bundle applications by risk rating. For example, the VM server can group applications into low, medium, and high-risk categories. After determining the risk profile of the user device, the VM server can load the application bundle(s) that matches the risk profile scenario. In another example, instead of creating bundles for each risk category, the VM server can store application bundles by user or group without respect to risk profile. When a user initiates a virtual session, the VM server can load the application bundle and disable or hide applications that do not fit in the risk profile. This kind of example can help save disk space because it requires fewer application bundles.

Turning to the sequence diagram of FIG. 2, at stage 202, a management agent executing on a user device can obtain operational data from a plurality of device sensors. As some examples, the operational data can include things like whether the operating system (OS) autoupdate service is enabled, whether security patches are up to date, whether drive encryption is enabled, virtual private network (VPN) status if installed, internet protocol security (IPSec) status, whether screen lock is enabled, whether the device firewall is configured appropriately, rooting and jailbreak detection enabled and running, whether the device is enrolled with the UEM, anti-virus installation (installed and active or expired), anti-virus signature age (virus samples recently updated), device authentication method for the device, smartcard or biometrics settings, whether multifactor authentication is enabled, specific services running like User Account Control (UAC), whether Encrypting File System (EFS) is enabled and running, whether DLP (Data Loss Prevention) is enabled and running, known vulnerabilities from installed apps and platform libraries, and any missing critical application security patches.

At stage 204, the management agent can transmit the operational data to a management service located on a management server. The user device can be managed, in part, by the management server. In one example, the management server may manage device enrollment and compliance enforcement within an enterprise UEM system. As a result of enrollment, control of certain functionality for the user device can be turned over to the management server. The management server can implement that control over the user device in a variety of ways, including by communicating instructions to the management agent and receiving responses from the management agent. These communications can flow through the management service, for example.

At stage 206, the management service can process the operational data in order to determine state values for various operational aspects of the user device. Operational aspects and respective state values are discussed in more detail with reference to stage 212 discussed below. The management server or platform can determine a compliance profile for the user device based on the operational data.

In one example, the compliance profile includes state values for a group of operational aspects. Together, the operational aspects can represent an overall level of compliance of the user device relative to a baseline standard of operating requirements that is enforced within a computing infrastructure. In another example, the compliance profile may include two parts: a compliance sub-profile, and a security sub-profile. The compliance sub-profile includes the state values that represent an overall level of compliance as discussed above. On the other hand, the security sub-profile can be derived from the compliance sub-profile by a security service upon being transmitted by the management service to the security service in stage 208. As described in more detail with reference to stage 212, the security service can consult databases, external or natively housed analytics, or intelligence platforms or services to generate the security sub-profile. These resources can define both internal or external threats and vulnerabilities, or otherwise assist the security service in deriving a profile of security, threats, and vulnerabilities for the user device, from a compliance sub-profile.

In one example, the management server may be an internal component of the computing infrastructure, and the management service can be an internal software-based tool implemented on the management server. Thus, the management server and its associated tools may be directly managed and controlled by administrative entities for the infrastructure. In another example, the management server can be provided and maintained by a third-party service provider. For example, the third-party service may be provided as a product, such as OPSWAT or AIRWATCH BY VMWARE, that secures and manages endpoints (e.g., user devices), by monitoring, classifying, assessing, and managing applications. In one example, such third-party service may be a cloud-based service that connects to an enterprise network to service various components of a computing infrastructure.

Upon receiving the compliance sub-profile in stage 208, the security service can execute a security assessment at stage 210. The security service can access internal and external resources, such as those mentioned above, and process the security-related information stored or obtained in light of the state values in the compliance sub-profile. Through comparison or other means of processing (e.g., estimating, extrapolating, implementing machine learning processes) that implements one or more algorithms, the security service can assess how secure or unsecure the user device is in stage 210. In another example, the security assessment can be based on a total number of compliant states reflected in the compliance sub-profile. For example, the management server can process and interpret the states that are non-compliant, as corresponding to system vulnerabilities or an overall degree of system vulnerability to various issues.

The security assessment can be output in the form of, or used to output, a security sub-profile. In one example, the security sub-profile may comprise a group of risk or security factors that (A) the security service determines values for, (B) are based on certain state values from the compliance sub-profile, and (C) are according to a set of rules established by an administrator. In another example, the security sub-profile may include one or more scores that the management server or gateway server can compare to a scale or other standard to determine how secure the user device is. At stage 212, the security service can transmit the security sub-profile to the management service.

In another example, stage 210 can be performed primarily by the management service, and stages 208 and 212 can be avoided. More specifically, the management service can communicate with the security service to obtain security information, execute the security assessment using the compliance sub-profile, and generate the security sub-profile. In this example, the security service can constitute, house, or provide access to the databases, analytics, or intelligence platforms or services, to act as a provider to or portal for the management service to obtain the required security information.

At stage 214, the management service processes the compliance and security sub-profiles to generate the compliance profile. In one example, the compliance profile is a combination of the two sub-profiles. In another example, the management service combines the compliance and security sub-profiles, derives state values or computes additional security scores from the combined information, and adds the additional information to the combined profiles to produce the compliance profile.

At stage 216, a VM client executing on the user device can transmit a virtual session launch request ("launch request") to a gateway agent for a gateway server. Transmission of the request can result from the VM client receiving input on the user device from a user through a user interface that is maintained by the user device as part of the VM client. The gateway server can be a reverse proxy server that is maintained behind a firewall in a private network. The gateway server can direct requests from clients to an appropriate backend server, such as the VM server. In another example, the gateway server can provide an added level of abstraction and control to ensure a smooth flow of network traffic between, for example, the VM client and the VM server, in accordance with various security protocols it implements.

In an example, the VM client can also send sensor data with the launch request at stage 216. Alternatively, the gateway agent can query the user device for sensor data upon receiving the launch request. For example, the VM client can send information relating to its active network connection, such as whether the device is connected to an open or password secured network, the wireless encryption mode for the network (WEP; WPA; WPA2), and the Geo/IP location of the device and the device location.

At stage 218, the gateway agent can communicate with the management service, to request and receive the compliance profile. The gateway agent can then send the launch request, sensor data, and compliance profile to a VM agent on the VM server at stage 220.

At stage 222, a policy engine on the VM server can determine a risk profile for the user device using the sensor data and compliance profile. The risk profile can indicate how vulnerable the user device is and which applications and data are potentially exploitable by an attacker to infiltrate into the corporate network or exfiltrate corporate data from the session. The risk profile can consider both the security posture of the user device and any risks posed by the user device's active network connection.

At stage 224, the VM agent can configure the virtual session. In an example, the policy engine can generate configuration settings according to the risk profile. The policy engine can then provide the configuration settings to the VM agent for configuring the virtual session. The configuration settings can apply restrictions to features of the virtual session depending on the risk level of the user device. In one example, the policy engine can store various schemes that correspond to user device risk levels.

Table 1 below illustrates example implementations of policy enforced configuration schemes that can be implemented in a virtual session.

TABLE 1

| User Device Operational Aspect(s) | State of Operational Aspect | Capability Impacted | Capability Configuration (Policy Enforcement) |
|---|---|---|---|
| Device encryption | Not encrypted | Data egress (data copied from session to user device) | Disabled - no data egress (enforce a data loss prevention policy) |
| Firewall software configuration | Unsecure configuration | i) Data egress<br>ii) Data ingress (data copied from user device to virtual session) | i) Disabled<br>ii) Disabled |
| Network authentication mode | Single factor (not multifactor) | i) BLUETOOTH device redirection<br>ii) Direction sensitive file transfer<br>iii) Document access | i) Disabled<br>ii) Enabled<br>iii) Only non-confidential/low sensitivity documents open |
| Wireless connection security | Unsecure-connected via open/public connection | i) BLUETOOTH device redirection<br>ii) Direction sensitive file transfer<br>iii) Data egress | i) Disabled<br>ii) Enabled<br>iii) Disabled |
| Screen capture software | Active - running on device | Document display within virtual session | Restricted to non-classified documents |
| Antivirus software | Running prior version | Connection to network | Virtual session quarantined to low criticality network segment to prevent access to backend network resources |

It will be noted that data egress and ingress control, as referred to in Table 1, can be implemented through multiple underlying virtual session capabilities, such as device drive mapping, clipboard copy/paste control and Universal Serial Bus (USB) device redirection. Device drive mapping redirection involves mapping a local drive on the user device to a virtual session or mapping a drive from the virtual session to the user device. Clipboard copy/paste control redirection involves copying and pasting files between the user device and the virtual session. USB device redirection involves forwarding a USB device's functionality from the user device to the virtual session, thus allowing the USB device to be accessed from within the virtual session.

Each scheme can determine which functions and features of an application within the virtual session are to be enabled or disabled. The applications can have different policies with regard to the policy enforcement for the different risk scenarios. Upon determining the risk profile of the user device, the policy engine can apply the corresponding scheme to the applications associated with the user or to an entire volume of applications.

The following example of an implementation of the virtual session configuration described above is illustrative of the applicability, and some of the advantages over an unaltered application of a zero-trust concept to a virtual environment. In the example, an employee of an enterprise can be sitting in a coffee shop, attempting to access a virtual session by connecting to an enterprise network through the coffee shop's unsecure internet connection, for example. The mobile device may be compliant with 99 out of 100 compliance rules. In one example, non-compliance with the remaining rule may potentially expose the enterprise computing infrastructure to threat of malicious data and/or code moving through a covert channel, from the mobile device into the enterprise computing infrastructure. In one example, the potential exposure manifests itself through the virtual session only when a user performs an explicit data copy action from the user device into the virtual session. Under an unaltered zero-trust application, because the mobile device is not compliant with this 1 rule out of 100 compliance rules, access to a virtual session is denied in total. This will be the case even though the threat will never materialize if the employee does not copy while exercising a task, and therefore can be safely mitigated by disallowing the employee from being able to copy into the virtual session. However, if a system for a computing infrastructure serving the employee was capable of implementing the wireless connection security in Table 1 above, the employee could successfully engage in a productivity generating activity in the coffee shop.

Staying with this example, when the employee returns to work, because the mobile device has not been used or otherwise allowed to access computing resources for the enterprise, security patches for the mobile device may not be up to date. The missing security patches may have no relation to what the employee would use the mobile device for with respect to a virtual session, but since it is out of compliance, the employee may have to wait minutes or hours for the enterprise to update the patches on the mobile device before a virtual session can be accessed. With an unaltered application of a zero-trust policy, the downtime of an ability to access a virtual session results in a loss of productivity for the enterprise. According to the present disclosure, a capability scheme could be generated and implemented to provide access to a virtual session while patches are being updated, instead of locking the employee out completely. More specifically, depending on the nature of the missing patch, for example an anti-virus patch, the scheme can limit some functionality, for example making the entire virtual session read only, until update is complete. As a result, the employee can work without interruption while security threats to a computing infrastructure are mitigated.

At stage 226, the policy engine can send an applications list to an application volumes agent ("app agent") on the VM server that includes the virtual session applications that fit the risk profile. The app agent can load applications from the list into the virtual session at stage 228. In an example, the app agent can load applications into a virtual session as containers that are attached to virtual machines in the form of Virtual Machine Disk (vmdk) volumes. This can allow the desktop template for virtual sessions to be clean with just the operating system. The VM agent can configure a virtual session with just an operating system, and the app agent can then load application containers into the virtual session according to instructions from the policy engine.

In one example, the operating system of the virtual session can have the applications already installed. In another example, multiple applications can be loaded simultaneously into the virtual session as a bundle. In such examples, instead of selectively enabling or loading applications into the virtual session, the app agent can disable applications that do not fit the risk profile. In an example, disabling an application can also include disabling or blocking access to files and directories associated with the application.

In one example, the app agent can disable certain features instead of an entire application. As an example, the policy engine determines that a user device does not satisfy all the security requirements, and accordingly the virtual session is configured to disable allowing the user to upload files from the user device into the virtual session. Instead of disabling any applications that have a feature that allows a user to upload files, the app agent can instead disable this feature on such applications.

The coffee shop example is illustrative of the applicability, and some of the advantages over an unaltered application of a zero-trust concept to a virtual environment, of several scenarios of enabling applications based on risk profile. The employee, while, sitting in a coffee shop, attempts to access a virtual session by connecting to an enterprise network through the coffee shop's unsecure internet connection, for example. In one example, non-compliance with the wireless connection security rule may potentially expose sensitive applications to threat of malicious data and/or code moving through a covert channel. For example, where the employee has access to a sensitive financial application in the virtual session, running the financial application on the virtual session while the user device is connected to an unsecure network may expose sensitive financial data. Under the unaltered zero-trust application, because the mobile device is not compliant with this one rule, access to a virtual session is denied in total. This will be the case even though the virtual session includes other non-sensitive applications that the employee can use. However, if the system is capable of disabling the sensitive financial application, as well as any other sensitive application, the threat can be safely mitigated while allowing the employee to be productive using other applications in the virtual session.

Staying with this example, when the employee returns to work, because the mobile device has not been used or otherwise allowed to access computing resources for the enterprise, security patches for the mobile device may not be up to date. The missing security patches may have no relation to what the employee would use the mobile device for with respect to a virtual session, but since it is out of compliance, the employee may have to wait minutes or hours for the enterprise to update the patches on the mobile device before a virtual session can be accessed. With an unaltered application of a zero-trust policy, the downtime of an ability to access a virtual session results in a loss of productivity for the enterprise. According to the present disclosure, the enterprise system can provide access to a virtual session while patches are being updated, instead of locking the employee out completely. More specifically, depending on the nature of the missing patch, for example an anti-virus patch, the system can limit some access to some applications, for example by disabling sensitive applications, until the update is complete. In some example, the system can disable certain application features that may be sensitive instead of disabling an entire application. As a result, the employee can work without interruption while security threats to a computing infrastructure are mitigated.

At stage 230, the VM agent can establish a virtual session communication channel with the VM agent. The virtual channel can be characterized as a communication pipe from the VM client to the virtual session. With the virtual channel established, the VM client can send input and requests received on the user device to the virtual session, and the virtual session can carry out operations based on the input and requests according to a capability scheme being implemented.

FIG. 3 illustrates an example sequence directed toward determining and enforcing a session application access after a virtual session has begun. In one example, the sequence illustrated in FIG. 3 can be an extension of the sequence of FIG. 2 directed to obtaining access to a virtual session. Whereas stage 230 described above defines the end of the first sub-sequence, it simultaneously defines the beginning of the second sub-sequence, as illustrated by stage 302 in FIG. 3.

At stage 304, the VM client can monitor and collect session data, which can be data related to the virtual session on the user device. Examples of such data can include, or be based on, user input processed by the VM client, ongoing operations by the user device, system updates, or any other action that involves a virtual sessions capability or a change to any aspect of the compliance profile. The VM client can send the session data to VM agent at stage 306. In one example, the VM client can periodically send the session data according to requirements by the policy engine. Alternatively, or simultaneously, the VM client can send relevant updates as they occur. As an example, if the user device initiates the virtual session while connected to a secure network, but the user device then connects to an open network, the VM client can send this update to the VM agent.

At stage 308, the VM agent can send the session data to the policy engine. Alternatively, the VM client can have a separate communication channel open with the policy engine for exchanging session data. The VM client then send the session data to the policy engine directly, thus eliminating the need for stage 308.

At stage 310, the policy engine can update the risk profile of the user device using the session data. The risk profile can be updated using the same methods described at stage 222 of FIG. 2. If the risk profile changes, at stage 312 the policy engine can determine whether any applications currently loaded in the virtual session no longer fit the risk profile. For example, where a user device disconnects from a secure network and connects to an open network, the policy engine may change the security risk of the user device from "low" to "high." The policy engine can determine whether any loaded applications require "medium" or "low" risk.

Where the policy engine identifies any loaded applications that no longer fit the risk profile, the policy engine can instruct the apps agent to disable those applications at stage 314. In some examples, this can include leaving one or more applications loaded, but disable certain features on them. The app agent can then update the applications according to the policy engine's instructions at stage 316.

In an example of the sequence described in FIG. 3, a user initiates a virtual session while the user device is connected to a secure network and the user device satisfies all the security requirements. The policy engine determines that the user device risk level is "low" and instructs the app agent to load all the available applications for the virtual session. The user later launches a virtual workspace session and reconnects to the virtual session on an open network. The VM client sends an update about the network change to the VM agent. The policy engine changes the security risk of the user device to "high" because of the network change. The policy engine identifies multiple applications that require modification according to the risk profile change. A first application requires a "low" risk profile, and a second application requires a "medium" risk profile for some features but allows a "high" profile risk for others. The policy engine sends instructions to the app agent to disable the first application entirely and to disable the features on the second application that require "medium" risk.

In another example, the risk profile change can result in the app agent enabling or reenabling applications mid-session. For example, the user in the previous example notices that certain applications and features have been disabled in the virtual session and realizes that the user device is connected to an open network. The user then connects the user device to a secured network that utilizes the required security protocols. The VM client updates the VM agent with this connection change. The policy engines lowers the user device's risk profile back to "low" risk and sends instructions to the app agent to reenable all the previously disabled applications and features.

FIG. 4 illustrates a schematic representing exemplary system components for permitting access to a virtual session and enabling select virtual session capabilities on a user device. As shown, the system components can include a user device 410, a management server 420, a gateway server 430, and a VM server 440. In an example, communication between the various servers and the user device can be facilitated through a network.

The user device 410 can be a device, such as a mobile phone, laptop, computer, tablet, or the like, that includes one or more processors and memory storage locations. The user device 410 can be part of a system comprising the system components of FIG. 4, as an enterprise-owned device configured to cooperate with the management server 420. In another example, the user device 410 can be user-owned and enrolled with the management server 420, and therefore at least partially supervised or managed by the management server 420. For example, a management agent 412 on the user device can implement policies and communicate compliance related information to a management service 422 on the management server 420. The user device 410 can be configured to include a VM client 414 that accesses a virtual session 416 at the VM server 440.

Each of the management, gateway, VM, and policy servers 420, 430, and 440 can include one or more servers that can each provide centralized management of, and operational data gathering from, a respective infrastructure of data entities. Each of these servers can: be a single server or a network of servers; utilize one or more processors and memory stores; provide an administrator with tools to manage an infrastructure; and run one or more VMWARE solutions, such as VSPHERE Client, VCENTER SERVER, and VREALIZE Suite.

The management server 420 can provide a UEM system with which devices, such as the user device 410, are enrolled. In one example, the management server 420 can receive a compliance profile from the VM client 414. In another example, the management server 420 can be configured to receive operational data from the user device 410 and extract state values for operational aspects that are part of a compliance profile. In either example, the management server 420 can process the state values of the operational aspects that define at least a compliance sub-profile, and determine a security sub-profile. Further, the management sever 420 can be provided with a tool that an administrator can use to set the operational aspects to be tracked, and how their state values may be interpreted to determine a security sub-profile.

In one example, the management server 420 can include one server or a group of servers distinct from the VM server 440. In another example, the management server 420 and the VM server 440 can be one and the same. In yet another example, the management server 420 can process operational data and produce a final compliance profile that is used by the gateway server 430 to determine if virtual session access will be granted. In an example, the final compliance profile can be produced by a security service 424. The management server 420 can be provided by a third party relative to an owner of at least the gateway 430 and VM servers 440. As discussed above, the management server 420 can belong to a third-party that provides a service product, such as OPSWAT, that secures and manages endpoints (e.g., user devices), by monitoring, classifying, assessing, and managing applications.

As previously described, the gateway server 430 can be a reverse proxy server that is maintained behind a firewall in a private network. The gateway server 430 can direct requests from clients to an appropriate backend server, such as the VM server 440. In another example, the gateway server 430 can provide an added level of abstraction and control to ensure a smooth flow of network traffic between, for example, the VM client and the VM server 440, in accordance with various security protocols it implements. In an example, the gateway server 430 can include a gateway agent 432 that handles these responsibilities.

As shown in FIG. 4, the VM server 440 includes a policy engine 444, a VM agent 442, and a VM apps volume agent ("apps agent") 446 at least in the sense that the VM server hosts a VM in which the VM agent 442, the policy engine 444, and the apps agent 446 run as services inside a guest OS of a VM/virtual session. In one example, the VM server 440 functions as a VM connection broker such that the VM server connects a virtual session launch request with an actual VM running inside a hypervisor. Accordingly, some virtual session capabilities described herein are implemented by actors as previously mentioned, running in a guest OS. Additionally, the VM server 440 can include a management interface, a backup agent, and a hypervisor (not shown). With these additional components, the VM server 440 can provide a two-way communication channel between it and the user device 410. Further, managed communication between these additional components enables the VM server 440 to generate, maintain, and support virtual machines, which can be accessed as the virtual sessions described herein.

The policy engine 444 can store and access session capability schemes and application access schemes that can be used either by the VM agent 442 and the app agent 446. In one example, the policy engine 444 can be on a separate server from, but be accessible by, the VM agent 442 and the app agent 446. In one example, the policy engine 444 can allow user profiles and personal settings to follow users across devices and ensure consistent user experiences. In another example, the policy engine 444 can additionally provide a tool or run a software product that enables an administrator to configure and deploy desktop computer settings for employees of an enterprise.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of enabling select virtual session applications on a user device configured to access virtual sessions, the method comprising:
   receiving a virtual session launch request for the user device, the launch request including network security information of the user device;
   determining a risk profile for the user device based on the network security information and a compliance profile of the user device;
   comparing risk requirements for a plurality of applications to the risk profile; and
   enabling a subset of the plurality of applications in the virtual session based on the comparison.

2. The method of claim 1, wherein enabling the subset includes:
   excluding a first application from the subset based on the risk profile containing a risk score that does not meet a first risk category of the first application; and
   including a second application in the subset based on the risk score meeting a second risk category of the second application, and
   wherein the first and second applications are specified as part of the plurality of applications by a user profile associated with the user device, the user profile being part of a unified endpoint management (UEM) system that assigns different applications to different users.

3. The method of claim 1, further comprising configuring the virtual session, wherein configuring the virtual session includes determining whether to enable a subset of session capabilities based on the risk profile.

4. The method of claim 3, wherein the subset of session capabilities includes at least one selected from
   a capability to perform device drive mapping redirection,
   a capability to perform clipboard control redirection,
   a capability to perform Universal Serial Bus (USB) device redirection,
   a capability to perform BLUETOOTH device redirection,
   a capability to copy data from the virtual session,
   a capability to copy data to the virtual session,
   a capability to allow or restrict display of classified documents,
   a capability to connect to a segment of a network that connects servers or databases that store sensitive data,
   a capability to access backend network resources, and
   a capability to perform direction-sensitive file transfers.

5. The method of claim 1, wherein
   the compliance profile is determined by a management agent of a management server for a UEM, the compliance profile being based on operational data of the user device, a gateway server receives the virtual session launch request, and, in response, retrieves the compliance profile from the management server, a virtual machine (VM) agent on a VM server receives the virtual session launch request and compliance profile from the gateway server, and the VM agent determines the risk profile, compares the risk requirements of the plurality of applications to the to the risk profile, and enables the subset of the plurality of applications.

6. The method of claim 1, wherein enabling a subset includes disabling certain functions of at least one application of the subset.

7. The method of claim 1, further comprising:

receiving additional network security information from the user device;

determining, based on the additional network security information, a change in the risk profile of the user device; and changing which of the plurality of applications are enabled based on the risk profile change.

8. A non-transitory, computer-readable medium containing instructions that, when executed by a hardware-based processor, performs stages for enabling select virtual session applications on a user device configured to access virtual sessions, the stages comprising:

receiving a virtual session launch request for the user device, the launch request including network security information of the user device;

determining a risk profile for the user device based on the network security information and a compliance profile of the user device;

comparing risk requirements for a plurality of applications to the risk profile; and enabling a subset of the plurality of applications in the virtual session based on the comparison.

9. The non-transitory, computer-readable medium of claim 8, wherein enabling the subset includes:

excluding a first application from the subset based on the risk profile containing a risk score that does not meet a first risk category of the first application; and including a second application in the subset based on the risk score meeting a second risk category of the second application, and wherein the first and second applications are specified as part of the plurality of applications by a user profile associated with the user device, the user profile being part of a unified endpoint management (UEM) system that assigns different applications to different users.

10. The non-transitory, computer-readable medium of claim 8, the stages further comprising configuring the virtual session, wherein configuring the virtual session includes determining whether to enable a subset of session capabilities based on the risk profile.

11. The non-transitory, computer-readable medium of claim 10, wherein the subset of session capabilities includes at least one selected from a capability to perform device drive mapping redirection,
a capability to perform clipboard control redirection,
a capability to perform Universal Serial Bus (USB) device redirection,
a capability to perform BLUETOOTH device redirection,
a capability to copy data from the virtual session,
a capability to copy data to the virtual session,
a capability to allow or restrict display of classified documents,
a capability to connect to a segment of a network that connects servers or databases that store sensitive data,
a capability to access backend network resources, and
a capability to perform direction-sensitive file transfers.

12. The non-transitory, computer-readable medium of claim 8, wherein the compliance profile is determined by a management agent of a management server for a UEM, the compliance profile being based on operational data of the user device, a gateway server receives the virtual session launch request, and, in response, retrieves the compliance profile from the management server, a virtual machine (VM) agent on a VM server receives the virtual session launch request and compliance profile from the gateway server, and the VM agent determines the risk profile, compares the risk requirements of the plurality of applications to the to the risk profile, and enables the subset of the plurality of applications.

13. The non-transitory, computer-readable medium of claim 8, wherein enabling a subset includes disabling certain functions of at least one application of the subset.

14. The non-transitory, computer-readable medium of claim 8, the stages further comprising:

receiving additional network security information from the user device;

determining, based on the additional network security information, a change in the risk profile of the user device; and changing which of the plurality of applications are enabled based on the risk profile change.

15. A system for enabling select virtual session applications on a user device configured to access virtual sessions, comprising:

a memory storage including a non-transitory, computer-readable medium comprising instructions; and a computing device including a hardware-based processor that executes the instructions to carry out stages comprising:

receiving a virtual session launch request for the user device, the launch request including network security information of the user device;

determining a risk profile for the user device based on the network security information and a compliance profile of the user device;

comparing risk requirements for a plurality of applications to the risk profile; and enabling a subset of the plurality of applications in the virtual session based on the comparison.

16. The system of claim 15, wherein enabling the subset includes:

excluding a first application from the subset based on the risk profile containing a risk score that does not meet a first risk category of the first application; and including a second application in the subset based on the risk score meeting a second risk category of the second application, and wherein the first and second applications are specified as part of the plurality of applications by a user profile associated with the user device, the user profile being part of a unified endpoint management (UEM) system that assigns different applications to different users.

17. The system of claim 15, further comprising configuring the virtual session, wherein configuring the virtual session includes determining whether to enable a subset of session capabilities based on the risk profile.

18. The system of claim 17, wherein the subset of session capabilities includes at least one selected from a capability to perform device drive mapping redirection, a capability to perform clipboard control redirection, a capability to perform Universal Serial Bus (USB) device redirection, a capability to perform BLUETOOTH device redirection, a capability to copy data from the virtual session, a capability to copy data to the virtual session, a capability to allow or restrict display of classified documents, a capability to connect to a segment of a network that connects servers or databases that store sensitive data, a capability to access backend network resources, and a capability to perform direction-sensitive file transfers.

19. The system of claim 15, wherein the compliance profile is determined by a management agent of a management server for a UEM, the compliance profile being based on operational data of the user device, a gateway server receives the virtual session launch request, and, in response, retrieves the compliance profile from the management server, a virtual machine (VM) agent on a VM server receives the virtual session launch request and compliance profile from the gateway server, and the VM agent determines the risk profile, compares the risk requirements of the plurality of applications to the to the risk profile, and enables the subset of the plurality of applications.

20. The system of claim 15, wherein enabling a subset includes disabling certain functions of at least one application of the subset.

* * * * *